United States Patent [19]

Kawasaki

[11] Patent Number: 5,267,023

[45] Date of Patent: Nov. 30, 1993

[54] SIGNAL PROCESSING DEVICE

[75] Inventor: Somei Kawasaki, Tokyo, Japan

[73] Assignee: Canon Kabushiki Kaisha, Tokyo, Japan

[21] Appl. No.: 780,719

[22] Filed: Oct. 21, 1991

[30] Foreign Application Priority Data

Nov. 2, 1990 [JP] Japan .................. 2-297607

[51] Int. Cl.$^5$ .................. H04N 9/65; H04N 9/66
[52] U.S. Cl. .................. 358/23; 358/40; 332/123; 332/125; 332/159
[58] Field of Search .................. 358/40, 37, 36, 35, 358/31, 23; 332/123, 125, 126, 124, 151, 152, 103, 162, 159, 160

[56] References Cited

U.S. PATENT DOCUMENTS

| | | | |
|---|---|---|---|
| 3,595,989 | 7/1971 | Hoke, Jr. .................. | 358/23 |
| 3,624,275 | 11/1971 | Lunn .................. | 358/40 |
| 3,628,046 | 12/1971 | Billoti .................. | 358/23 |
| 4,122,491 | 10/1978 | Yamaguchi et al. .................. | 358/23 |
| 4,481,490 | 11/1984 | Huntley .................. | 332/152 |
| 4,724,405 | 2/1988 | Matthies et al. .................. | 358/40 |
| 5,095,290 | 3/1992 | Sevenhans et al. .................. | 332/162 |

*Primary Examiner*—James J. Groody
*Assistant Examiner*—Michael H. Lee
*Attorney, Agent, or Firm*—Robin, Blecker, Daley & Driscoll

[57] ABSTRACT

A signal processing device is arranged to form a first output modulated signal by modulating an input information signal in accordance with a modulation carrier signal, to form a second output modulated signal by modulating the first output modulated signal in accordance with a modulation carrier signal which is identical to the above-stated modulation carrier signal, and to correct the input information signal by using the second output modulated signal. The modulation circuit of the device is thus arranged to have a minimal amount of leakage of the modulation carrier signal for the information signal, so that the device can be easily arranged as an integrated circuit.

7 Claims, 5 Drawing Sheets

FIG.3(a) fsc 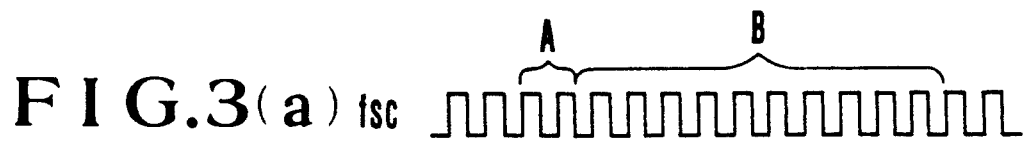
FIG.3(b) VIN 
FIG.3(c) Q15 
FIG.3(d) Q17 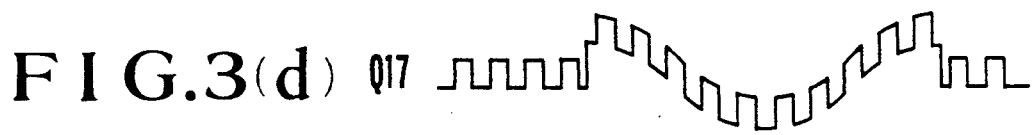
FIG.3(e) Q19 
FIG.3(f) Q21 
FIG.3(g) V01 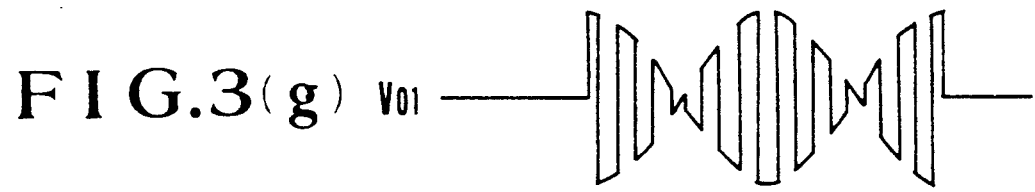
FIG.3(h) V02 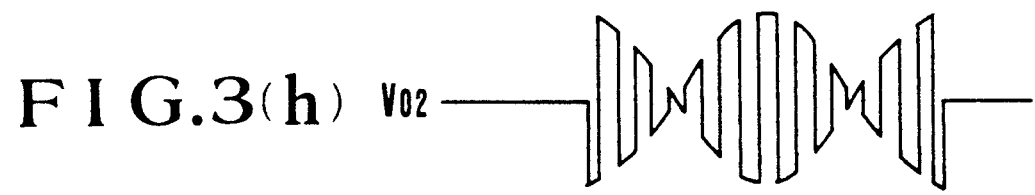
FIG.3(i) CLP 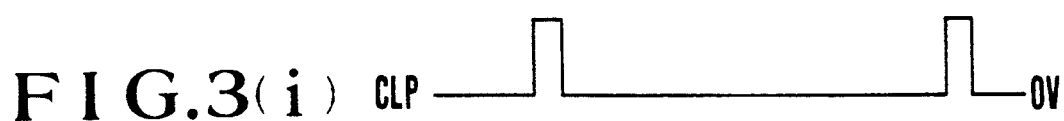

FIG.4(a) fsc 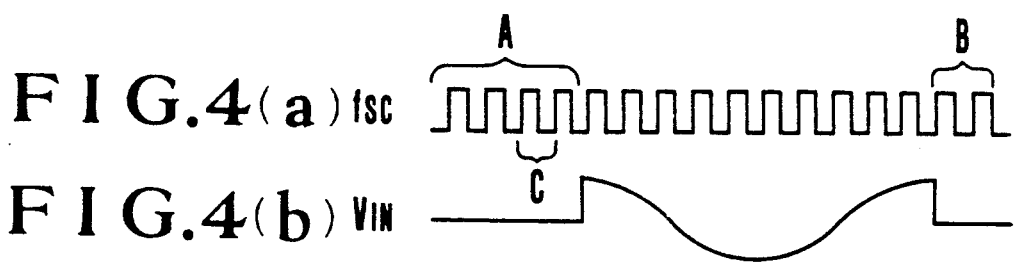
FIG.4(b) VIN 
FIG.4(c) Q15 
FIG.4(d) Q17 
FIG.4(e) Q19 
FIG.4(f) Q21 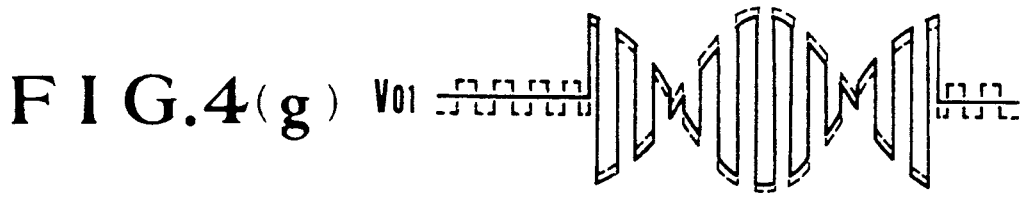
FIG.4(g) V01 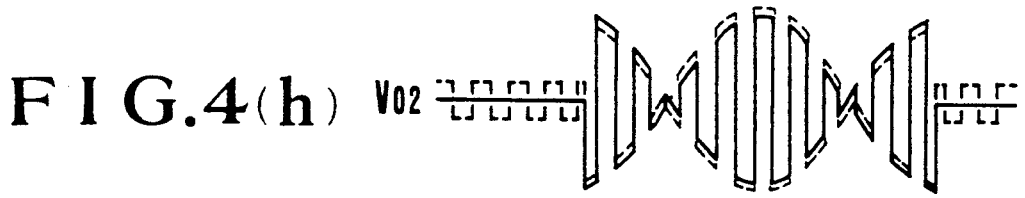
FIG.4(h) V02 
FIG.4(i) CLP
FIG.4(j) $\Delta i$ 

SIGNAL PROCESSING DEVICE

BACKGROUND OF THE INVENTION

1. Field of the Invention

This invention relates to a signal processing device which is arranged to process an information signal.

2. Description of the Related Art

An electronic still video system has been known as one of the information signal processing devices.

The electronic still video system is arranged as follows: a luminance component of a color still image signal is frequency-modulated. Two color-difference signals which are included in the color still image signal as a chrominance component are frequency-modulated after they are processed into a color-difference line-sequential signal. The frequency-modulated luminance signal and the frequency-modulated color-difference line-sequential signal thus obtained are frequency-multiplexed into a recording image signal to be recorded on a magnetic disc. The recording image signal recorded on the magnetic disc is reproduced. From the reproduced signal, the frequency-modulated luminance signal and the frequency-modulated color-difference line-sequential signal are separated. These separated signals are frequency-demodulated. After frequency demodulation, the color-difference line-sequential signal is restored to the two color-difference signals by converting the line-sequential state into a coincident state. The two color-difference signals are further converted into a chrominance signal by quadrature two-phase modulation. The chrominance signal thus obtained is frequency-multiplexed with the frequency-demodulated luminance signal to obtain and output a TV signal from the electronic still video system.

FIG. 1 of the accompanying drawings shows in outline and in part the arrangement of a signal processing circuit included in the reproducing apparatus of the above-stated electronic still video system. The circuit shown in FIG. 1 represents a chrominance color encoder which is arranged to convert the two kinds of color-difference signals into a chrominance signal by using balanced modulators.

Referring to FIG. 1, a color-difference signal R-Y is inputted to a clamp circuit 1 and a color-difference signal B-Y to a clamp circuit 3. These signals R-Y and B-Y are clamped for a period of time designated by clamp pulse signals CLP which are inputted respectively to the clamp circuits 1 and 3. After the clamping process, the signal R-Y is supplied to a balanced modulator 2 and the signal B-Y to a balanced modulator 4. A modulation carrier signal fsc1 is supplied to the balanced modulator 2 and a modulation carrier signal fsc2 to the balanced modulator 4. Each of these balanced modulators 2 and 4 is arranged to perform a balanced modulating process on the signal R-Y or the signal B-Y with the modulation carrier signal fsc1 or fsc2. The outputs of the balanced modulators 2 and 4 are supplied to an adder 5.

In cases where the modulation carrier signals fsc1 and fsc2 are arranged to conform to the TV signal of, for example, the NTSC color system, both the modulation carrier signals fsc1 and fsc2 are arranged to be at a frequency 3.58 MHz. The phase of the carrier signal fsc1 is then arranged to be at 90° while that of the other carrier signal fsc2 is at 0°. At the adder 5, a chrominance signal is formed by adding together the signals supplied from the balanced modulators 2 and 4. The chrominance signal thus formed is outputted from the adder 5.

FIG. 2 is a circuit diagram showing in part the circuit arrangement of the color encoder shown in FIG. 1. The circuit of FIG. 2 corresponds to the clamp circuit 1 and the balanced modulator 2 or to the clamp circuit 3 and the balanced modulator 4 shown in FIG. 1.

FIGS. 3(a) to 3(i) and 4(a) to 4(j) show, in timing charts, signal waveforms obtained from the various parts of the circuit shown in FIG. 2. The operation of the circuit shown in FIG. 2 is described below with reference to FIGS. 3(a) to 3(i) and 4(a) to 4(j):

Referring to FIG. 2, a clamp circuit is formed with transistors Q1 to Q5, resistors R2 to R4 and a capacitor C1. A clamp pulse signal CLP which is as shown at FIG. 4(i) is inputted to the base of the transistor Q5.

Assuming that a voltage obtained when the clamp pulse signal CLP is at a high level is "K1·Vcc+VBE" (wherein K1 represents a constant, Vcc a power supply voltage and VBE a voltage between the base and the emitter of the transistor Q5). For example, a constant current flows to an analog switch which consists of transistors Q1 and Q2 through a current mirror circuit which consists of transistors Q3 and Q4. The constant current is thus applied to the analog switch during the high-level period of the clamp pulse signal CLP. The DC potential of the color encoder is thus fixed at a bias potential V1.

In a case where horizontal synchronizing pulses are employed as the clamp pulse signal CLP, for example, a clamping action is performed to fix at above-stated bias potential V1 the blanking level of the color-difference signal which is inputted from a terminal VIN in a state as shown in FIG. 4(b).

The color-difference signal which has been subjected to the above-stated clamping action is supplied to the base of a transistor Q6 which forms a buffer circuit. The output of the transistor Q6 is inputted to a differential amplifier which consists of transistors Q8 and Q10. The output of the differential amplifier is inputted to the balanced modulator as two differential output signals.

A circuit which is composed of transistors Q31, Q12 and Q13 and resistors R26 and R11 is arranged to form another reference voltage input (a blanking level) for the differential amplifier. The base of the transistor 31 of this circuit is caused to be constantly in a saturated state by the resistor 26 and to have a saturation voltage between the collector and the emitter thereof. This is because the clamping analog switch which is formed by the transistors Q1 and Q2 is also in a saturated state like the transistor Q31 during the clamping process of the clamping analog switch, i.e., during the blanking period, and the base voltage of the transistor Q6 is not at the bias potential V1 and is higher than the bias voltage V1 by as much as the saturation voltages of the transistors Q1 and Q2. The constant saturated state of the base of the transistor Q31 is thus arranged to permit compensation for the higher portion of the base voltage of the transistor Q6. This compensation can be made by suitably adjusting the value of the resistor R26.

Assuming that a value "K2·Vcc+VBE" (wherein K2 represents a constant, Vcc the power supply voltage and VBE a voltage between the base and the emitter of the transistor to be connected) is expressed as V2 and that a resistor R5 is equal to a resistor R11, a resistor R7 is equal to a resistor R10 and a resistor R6 is equal to a resistor 9, differential signals obtained by compensating the color-difference signal are inputted to the transistors Q14 and Q18.

Meanwhile, the modulation carrier signal fsc which is as shown in FIG. 3(a) is inputted to the bases of transistors Q15, Q17, Q19 and Q21; and four kinds of signals which are balanced-modulated with the modulation carrier signal fsc and are as shown in FIGS. 3(c) to 3(f) are outputted from the collectors of the transistors Q15, Q17, Q19 and Q21, respectively. The voltage level of the modulation carrier signal fsc which is included in the signals shown in FIGS. 3(c) to 3(f) is determined by currents flowing to resistors R12, R13, R15 and R16. For example, the voltage level of the modulation carrier signal fsc is arranged to be set at about 0.2 V with the resistors R12, R13, R15 and R16 assumed to be of equal values.

Resistors R20 and R22 are arranged to be of equal values, and resistors R18 and R23 are arranged to be of equal valves. With these resistors thus arranged, transistors Q23 and Q25 become operative and transistors Q22 and Q26 inoperative during the high-level period of the modulation carrier signal fsc shown in FIG. 3(a). This is because the voltage level of the modulation carrier signal fsc included in the signals shown in FIGS. 3(c) to 3(f) are about 8 VT (VT=KT/q, wherein K represents a Boltzmann's constant; T the absolute temperature; and q the electric charge of electrons). Then, in each of the two pairs of transistors Q22 and Q23 and transistors Q25 and Q26, one transistor of the pair can be completely turned off.

At this time, the signal outputted from the collector of the transistor Q25 is outputted from an output terminal VO1 as shown in FIG. 2. The signal from the collector of the transistor Q23 is outputted from another output terminal VO2. This means that the outputs of a differential amplifier which is formed by the transistors Q23 and Q25 are outputted from the output terminals VO1 and VO2 of FIG. 2.

During the low-level period of the modulation carrier signal fsc which is as shown in FIG. 3(a), the transistors Q22 and Q26 are operative while the transistors Q23 and Q25 are inoperative. Then, the outputs of a differential amplifier, which is formed by the transistors Q22 and Q26, are outputted from the output terminals VO1 and VO2.

In a case where the differential color-difference signals which are inputted to the bases of the transistors Q14 and Q18 are balanced in terms of both direct and alternating currents, the balanced-modulated color-difference signals which are as shown in FIGS. 3(g) and 3(h) are not outputted from the output terminals VO1 and VO2 during a period of time A shown in FIGS. 3(a) to 3(i), that is, during the blanking period. The balanced-modulated color-difference signals are outputted from the output terminals VO1 and VO2 as shown in FIGS. 3(g) and 3(h) during a period of time B which is also shown in FIGS. 3(a) to 3(i), that is, during a period of having the color-difference components present.

However, a circuit arranged in the above-stated manner hardly performs a normal operation if the characteristics of each pair of elements are not matched to each other. For example, in a case where the circuit shown in FIG. 2 is arranged in the form of an integrated circuit, current density would be changed by unevenness of the areas of the emitters of the transistors resulting from deviations of mask pattern, etc. The change in current density then causes an error $\Delta VBE$ of the voltage between the base and the emitter of each transistor.

The above-stated error $\Delta VBE$ also arises if each pair of transistors have uneven characteristics among the transistors Q1 to Q13 and Q31 shown in FIG. 2. If, for example, the DC potential of the color-difference signal supplied to the transistor Q14 is a little higher than that of the color-difference signal supplied to the transistor Q18, the error $\Delta VBE$ causes the level of normal signal waveforms which are as shown by full lines in FIGS. 4(c) and 4(d) to change to signal waveforms which are shown by dotted lines in FIGS. 4(c) and 4(d). As a result, modulation carrier components would be generated during the blanking periods A and B, as shown by dotted lines in FIGS. 4(g) and 4(h).

In a case where the image signal has no color component, a black-and-white image signal is reproduced by a reproducing apparatus having the circuit of FIG. 2 or, where there is no image signal itself, the above-stated phenomenon causes such a color component that should not be generated to appear on a monitor device which is connected to the reproducing apparatus having the circuit of FIG. 2. Further, if the level of the color-difference signal supplied to the circuit described is low, the levels of balanced-modulated color-difference components would vary to cause changes in the hues of the original color components.

As a result of the recent trend of microminiaturizing integrated circuits, it has become extremely difficult to reduce the error $\Delta VBE$ which is resulting from the positional deviation of a mask pattern in arranging the circuit described above in the form of an integrated circuit. This difficulty has caused either the color encoder to be discretely arranged, instead of arranging it in the form of an integrated circuit, or an additional circuit to be arranged outside of the color encoder to compensate for any leakage in the modulation carrier component resulting from the above-stated error $\Delta VBE$.

SUMMARY OF THE INVENTION

It is a general object of this invention to provide a signal processing device which is capable of solving the above-stated problems.

It is a more specific object of the invention to provide a signal processing device which has a modulation circuit arranged to have a minimal leakage of a modulation carrier for an information signal, without requiring any terminal for connecting an external element, and can be easily arranged in the form of an integrated circuit.

Under this object, a signal processing device arranged as an embodiment of this invention to process an information signal comprises: a first modulator arranged to modulate an input information signal in accordance with a modulation carrier signal and to output a first output modulated signal; a second modulator arranged to modulate the first output modulated signal outputted from the first modulator in accordance with a modulation carrier signal which is identical to the modulation carrier signal used by the first modulator and to output a second output modulated signal; and an information signal correcting circuit for correcting the information signal being inputted to the first modulator by using the second output modulated signal outputted from the second modulator.

It is another object of the invention to provide a signal processing device which does not require any additional terminal for connecting an external element and is arranged to be capable of forming good balanced-modulated color-difference signals, by minimizing signal deterioration due to a leakage of a balanced-modulation carrier in performing a balanced-modulation process on color-difference signals, and to be easily formable as an integrated circuit.

Under that object, a signal processing device arranged as an embodiment of this invention to process an information signal comprises: an input coupling capacitor to which a color-difference signal is inputted; a differential amplifier arranged to convert the color-difference signal inputted through the input coupling capacitor into a differential color-difference signal and to output the differential color-difference signal; a first balanced modulator arranged to perform a balanced-modulation process on the differential color-difference signal outputted from the differential amplifier in accordance with a modulation carrier signal and to output a first output modulated signal; a second balanced modulator arranged to perform a balanced-modulation process on the first output modulated signal outputted from the first balanced modulator in accordance with a modulation carrier signal which is identical to the modulation carrier signal used by the first balanced modulator and to output a second output modulated signal; and a differential current forming circuit arranged to convert a current of the second output modulated signal outputted from the second balanced modulator into a differential current and to supply the differential current to the input coupling capacitor.

A further object of the invention is to provide a signal processing device which is capable of forming a good chrominance signal by minimizing signal deterioration in forming the chrominance signal from two kinds of color-difference signals.

A signal processing device which is arranged according to this invention to form a chrominance signal from two kinds of color-difference signals comprises: a first input coupling capacitor to which a first color-difference signal is inputted; a second input coupling capacitor to which a second color-difference signal is inputted; a first differential amplifier arranged to convert the first color-difference signal inputted through the first input coupling capacitor into a first differential color-difference signal and to output the first differential color-difference signal; a second differential amplifier arranged to convert the second color-difference signal inputted through the second input coupling capacitor into a second differential color-difference signal and to output the second differential color-difference signal; a first balanced modulator arranged to perform a balanced-modulation process on the first differential color-difference signal outputted from the first differential amplifier in accordance with a first modulation carrier signal and to output a first balanced-modulated color-difference signal; a second balanced modulator arranged to perform a balanced-modulation process on the second differential color-difference signal outputted from the second differential amplifier in accordance with a second modulation carrier signal and to output a second balanced-modulated color-difference signal; a third balanced modulator arranged to perform a balanced-modulation process on the first balanced-modulated color-difference signal outputted from the first balanced modulator in accordance with the first modulation carrier signal and to output a third balanced-modulated color-difference signal; a fourth balanced modulator arranged to perform a balanced-modulation process on the second balanced-modulated color-difference signal outputted from the second balanced modulator in accordance with the second modulation carrier signal and to output a fourth balanced-modulated color-difference signal; a first differential current forming circuit arranged to convert a current of the third balanced-modulated color-difference signal outputted from the third balanced modulator into a first differential current and to supply the first differential current to the first input coupling capacitor; a second differential current forming circuit arranged to convert a current of the fourth balanced-modulated color-difference signal outputted from the fourth balanced modulator into a second differential current and to supply the second differential current to the second input coupling capacitor; and an adder arranged to add together the first balanced-modulated color-difference signal outputted from the first balanced modulator and the second balanced-modulated color-difference signal outputted from the second balanced modulator and to output a chrominance signal.

The above and other objects and features of the invention will become apparent from the following detailed description of an embodiment thereof taken in conjunction with the accompanying drawings.

BRIEF DESCRIPTION OF THE DRAWINGS

FIGS. 3(a) to 3(i) and 4(a) to 4(j) show signal waveforms of various parts of the circuit shown in FIG. 2 or various parts of a circuit shown in FIG. 5, for the purpose of showing in timing charts the operation of the circuit of FIG. 2 or FIG. 5.

DETAILED DESCRIPTION OF THE PREFERRED EMBODIMENT

Figure 1:
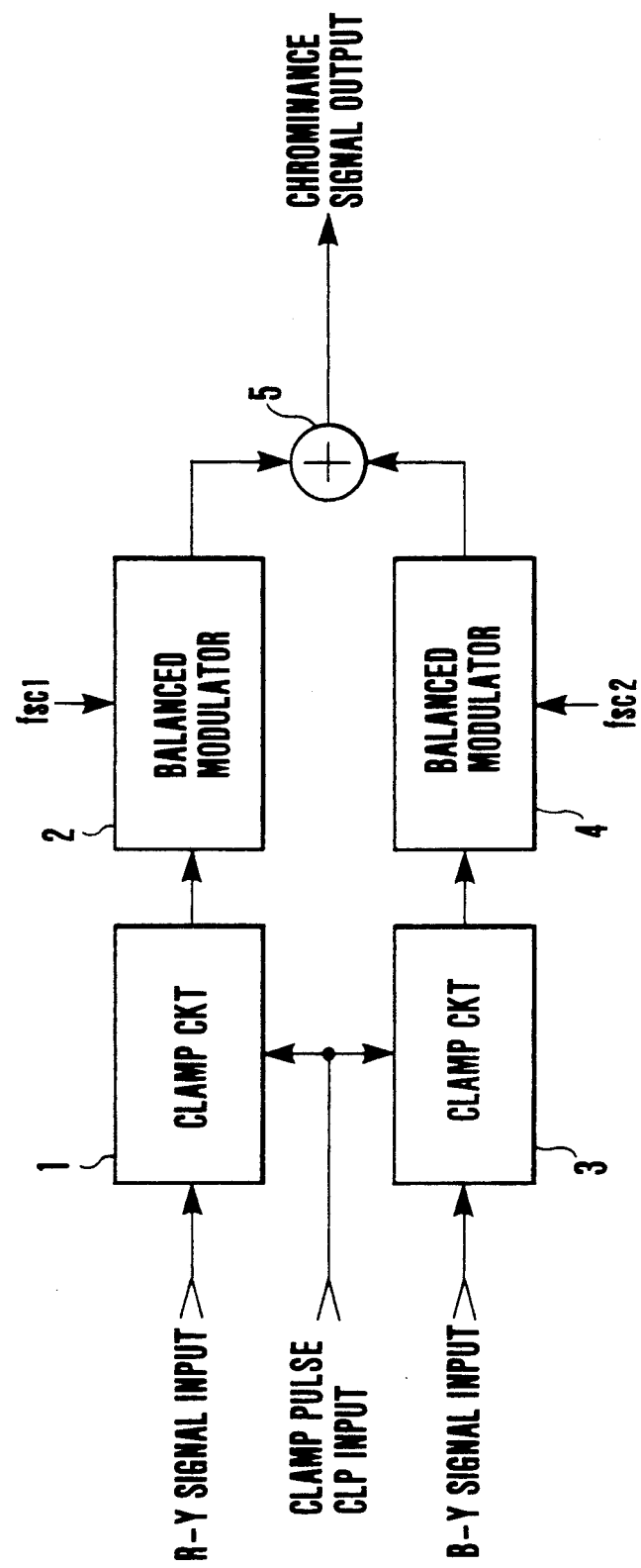
FIG. 1 is a block diagram showing the circuit arrangement of a chrominance color encoder which is a part of the signal processing device of a reproducing apparatus included in the electronic still video system.
Figure 2:
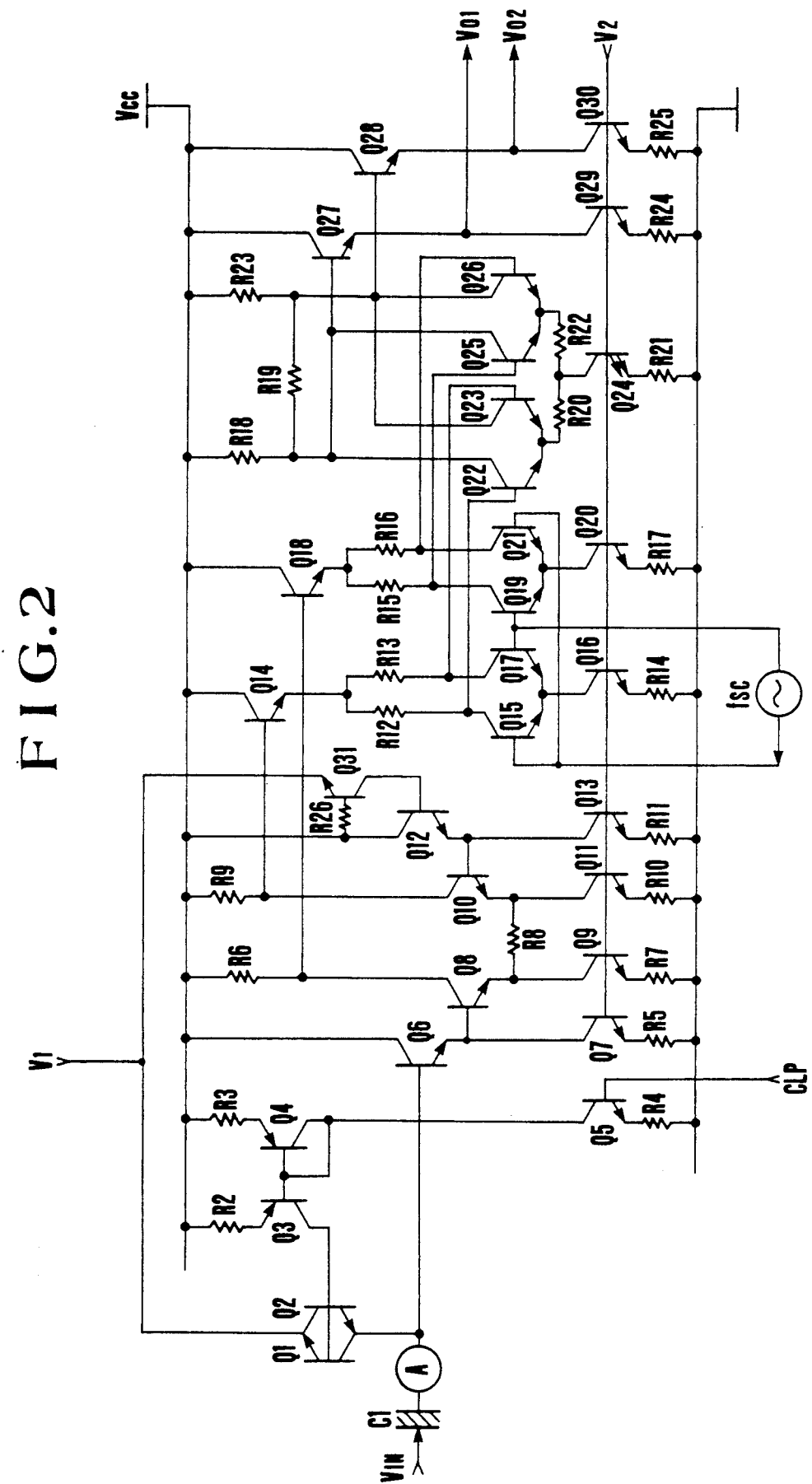
FIG. 2 is a circuit diagram showing in part the circuit arrangement of the color encoder of FIG. 1.
Figure 5:
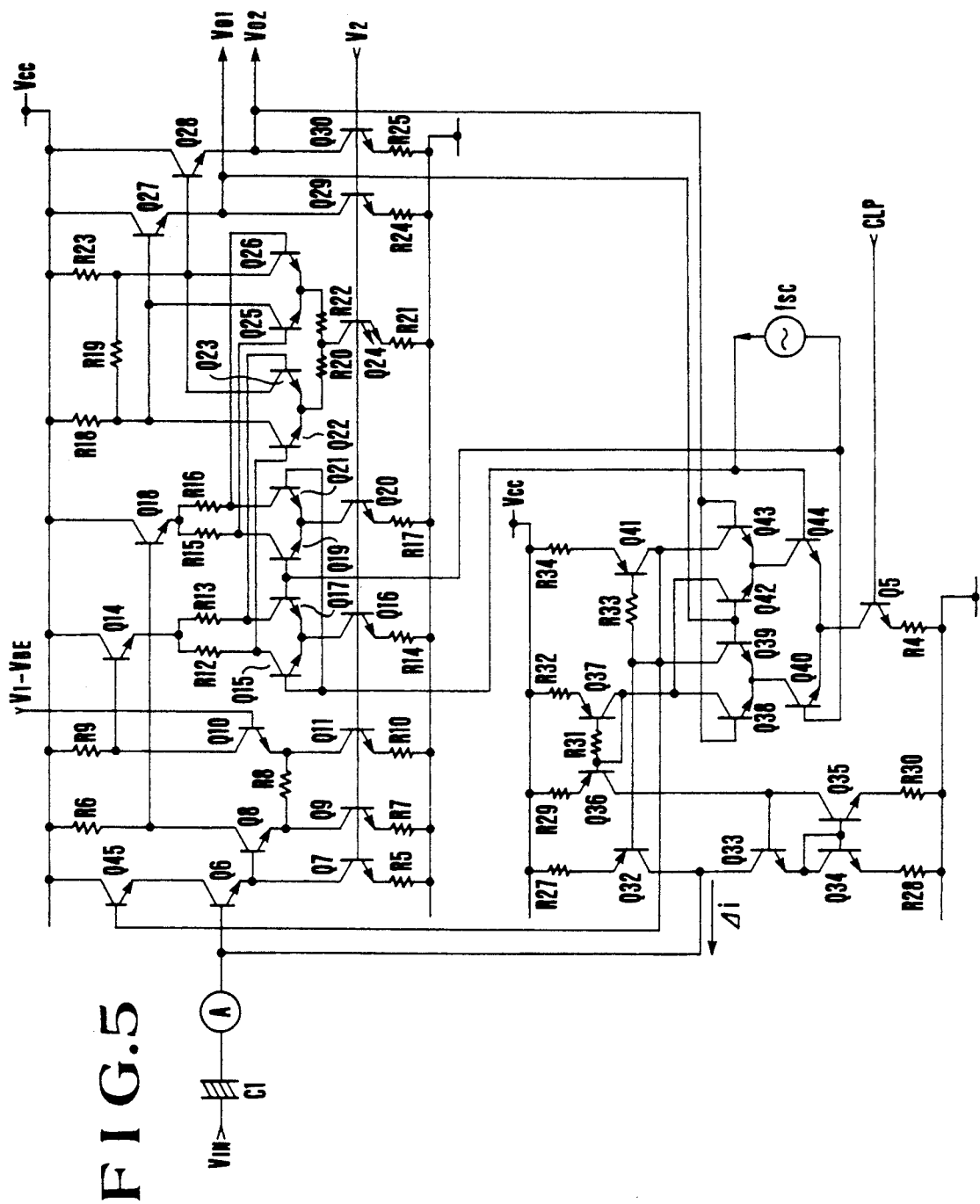
FIG. 5 is a circuit diagram showing a signal processing circuit which is arranged according to this invention as an embodiment thereof.

The following describes the details of this invention through an embodiment thereof:

FIG. 5 shows the arrangement of a signal processing circuit which is arranged according to this invention as an embodiment thereof. In FIG. 5, the component parts which are similar to those shown in FIG. 2 described in the foregoing are indicated by the same reference numerals and the details of them are omitted from the following description which covers only such parts that differ from the conventional circuit arrangement shown in FIG. 2.

Referring to FIG. 5, two balanced-modulated signals which are outputted from the terminals VO1 and VO2 of a first balanced modulator are supplied further to a second balanced modulator which is composed of transistors Q38 to Q44 and Q5 and a resistor R4. To the second balanced modulator is also supplied a modulation carrier signal fsc which is identical to a modulation carrier signal fsc supplied to the first balanced modulator.

Further, the second balanced modulator is arranged to be caused by the transistor Q5 and the resistor R4 to operate only for a given blanking period during which a clamp pulse signal CLP is present.

In a case where the DC level of the signal inputted to the base of the transistor Q14 of FIG. 5 and that of the signal inputted to the base of the transistor Q18 are out of balance, balanced-modulated color-difference signals which are as indicated by dotted lines in FIGS. 4(g) and 4(h) come to be outputted from the terminals VO1 and VO2. The transistor Q40 remains inoperative and the transistor Q44 operates during a period of time C shown in FIG. 4(a). At this time, the transistors Q42 and Q43 operate as a differential amplifier. Then, a differential current forming circuit which is composed of the transistors Q32 to Q37 and Q41 and resistors R27 to R34 forms a differential current $\Delta i$ as shown in FIG. 4(j) and supplies the differential current $\Delta i$ to a coupling capacitor C1 which is shown in FIG. 5.

Further, during the above-stated period of time C, a negative differential current $\Delta i$ is supplied to the coupling capacitor C1 as indicated by a dotted line in FIG. 4(j). The negative differential current $\Delta i$ acts to lower the base voltage of the transistor Q6. Therefore, the DC levels of two differential color-difference signals inputted to the bases of the transistors Q14 and Q18 which have been causing the characteristics of balanced modulators to be out of balance in such a way as to lower the DC potential of the transistor Q14 are corrected. Any leakage in the modulation carrier signal fsc included in the signals outputted from the terminals VO1 and VO2 can be corrected by this DC level correction.

A transistor Q45 is arranged to constantly prevent the coupling capacitor C1 from being caused to discharge by the base current of the transistor Q5.

With the embodiment arranged in the manner as described above, a current which is approximately equal to the base current of the transistor Q6 is added to the differential current $\Delta i$. Therefore, the base current of the transistor Q6 can be prevented from flowing into the coupling capacitor C1.

When the polarity of the modulation carrier signal fsc changes while the second balanced modulator is in operation, a secondary component of the modulation carrier signal fsc mixes into the differential current $\Delta i$. However, since the capacity of the coupling capacitor C1 is sufficiently large, the secondary component of the modulation carrier signal fsc never appears in the color-difference signal inputted from the terminal VIN.

In the embodiment described, a differential amplifier, which converts a color-difference signal into two differential signals through the coupling capacitor, forms a color encoder in conjunction with a first balanced modulator. Two differential balanced-modulated output signals outputted from the first balanced modulator are supplied to a second balanced modulator which operates only during a given period within a blanking period. A modulation carrier signal which is identical to that inputted to the first balanced modulator is inputted to the second balanced modulator. Two differential balanced-modulated output currents which are outputted from the second balanced modulator are converted by a differential current forming circuit into a differential current $\Delta i$. The differential current $\Delta i$ thus obtained is supplied to the above-stated coupling capacitor. In arranging the signal processing device in the form of an integrated circuit, the arrangement described above enables the device to stably output the balanced-modulated signals, with a less amount of leakage of the modulation carrier signal and without necessitating the provision of any external terminal for connecting an external element. Therefore, the device can be easily arranged in the form of an integrated circuit.

In accordance with this invention, as described in the foregoing, a modulation circuit which has a less amount of leakage of a modulation carrier component can be arranged without any external terminal arrangement for connection with an external element. Therefore, the signal processing device according to this invention can be easily arranged in the form of an integrated circuit.

What is claimed is:

1. A signal processing device for processing an information signal, comprising:
   a) an input coupling capacitor arranged to receive the information signal;
   b) a differential amplifier arranged to convert the information signal input through said input coupling capacitor into a differential information signal and to output the differential information signal;
   c) a first balanced modulator arranged to perform a balanced-modulation process on the differential information signal output by said differential amplifier in accordance with a modulation carrier signal and to output a first balanced-modulated information signal;
   d) a second balanced modulator arranged to perform a balanced-modulation process on the first balance-modulated information signal and to output a second balanced-modulated information signal; and
   e) a differential current forming circuit arranged to convert a current of the second balance-modulated information signal output from said second balanced-modulator into a differential current and to supply the differential current to said input coupling capacitor.

2. A device according to claim 1, wherein said signal processing device further comprises a clamp pulse generator arranged to generate a clamp pulse signal corresponding to a predetermined period of the information signal, and wherein said second balanced modulator is arranged to operate in accordance with the clamp pulse signal generated by said clamp pulse generator.

3. A device according to claim 1, wherein said information signal is a color information signal and includes a color-difference signal.

4. A signal processing device for processing an information signal, comprising:
   a) an input coupling capacitor to which a color-difference signal is inputted;
   b) a differential amplifier arranged to convert the color-difference signal inputted through said input coupling capacitor into a differential color-difference signal and to output the differential color-difference signal;
   c) a first balanced modulator arranged to perform a balanced-modulation process on the differential color-difference signal outputted from said differential amplifier in accordance with a modulation carrier signal and to output a first output modulated signal;
   d) a second balanced modulator arranged to perform a balanced-modulation process on the first output modulated signal outputted from said first balanced modulator in accordance with a modulation carrier signal which is identical to the modulation carrier signal used by said first balanced modulator and to output a second output modulated signal; and
   e) a differential current forming circuit arranged to convert a current of the second output modulated signal outputted from said second balanced modulator into a differential current and to supply the differential current to said input coupling capacitor.

5. A device according to claim 4, further comprising a clamp pulse generator arranged to generate a clamp pulse signal corresponding to a blanking period of the color-difference signal, and wherein said second balanced modulator is arranged to operate in accordance with the clamp pulse signal generated by said clamp pulse generator.

6. A signal processing device for forming a chrominance signal from two kinds of color-difference signals, comprising:
 a) a first input coupling capacitor to which a first color-difference signal is inputted;
 b) a second input coupling capacitor to which a second color-difference signal is inputted;
 c) a first differential amplifier arranged to convert the first color-difference signal inputted through said first input coupling capacitor into a first differential color-difference signal and to output the first differential color-difference signal;
 d) a second differential amplifier arranged to convert the second color-difference signal inputted through said second input coupling capacitor into a second differential color-difference signal and to output the second differential color-difference signal;
 e) a first balanced modulator arranged to perform a balanced-modulation process on the first differential color-difference signal outputted from said first differential amplifier in accordance with a first modulation carrier signal and to output a first balanced-modulated color-difference signal;
 f) a second balanced modulator arranged to perform a balanced-modulation process on the second differential color-difference signal outputted from said second differential amplifier in accordance with a second modulation carrier signal and to output a second balanced-modulated color-difference signal;
 g) a third balanced modulator arranged to perform a balanced-modulation process on the first balanced-modulated color-difference signal outputted from said first balanced modulator in accordance with the first modulation carrier signal and to output a third balanced-modulated color-difference signal;
 h) a fourth balanced modulator arranged to perform a balanced-modulation process on the second balanced-modulated color-difference signal outputted from said second balanced modulator in accordance with the second modulation carrier signal and to output a fourth balanced-modulated color-difference signal;
 i) a first differential current forming circuit arranged to convert a current of the third balanced-modulated color-difference signal outputted from said third balanced modulator into a first differential current and to supply the first differential current to said first input coupling capacitor;
 j) a second differential current forming circuit arranged to convert a current of the fourth balanced-modulated color-difference signal outputted from said fourth balanced modulator into a second differential current and to supply the second differential current to said second input coupling capacitor; and
 k) an adder arranged to add together the first balanced-modulated color-difference signal outputted from said first balanced modulator and the second balanced-modulated color-difference signal outputted from said second balanced modulator and to output a chrominance signal.

7. A device according to claim 6, further comprising a clamp pulse generator arranged to generate a clamp pulse signal corresponding to a blanking period of the first or second color-difference signal, and wherein said third and fourth balanced modulators are arranged to operate in accordance with the clamp pulse signal generated by said clamp pulse generator.

* * * * *